Oct. 11, 1938.  N. L. DALTON  2,133,190
LIQUID LEVEL CONTROL APPARATUS
Filed Sept. 28, 1936   2 Sheets-Sheet 2
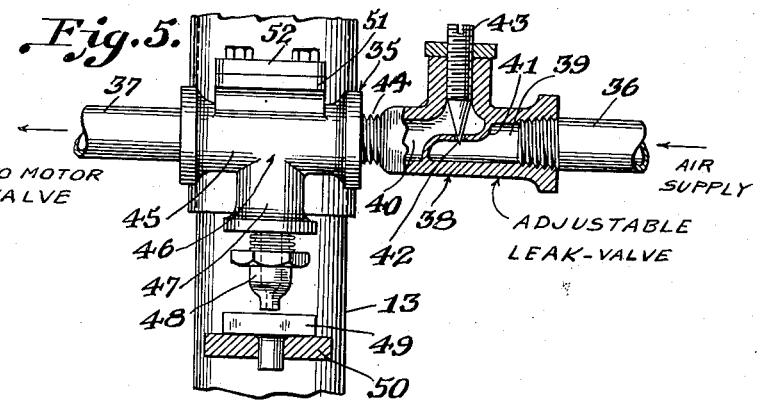
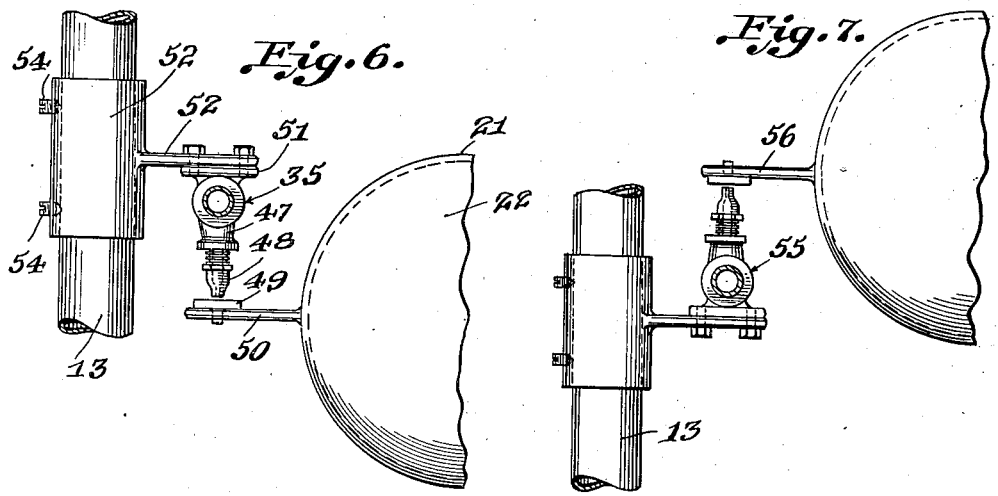
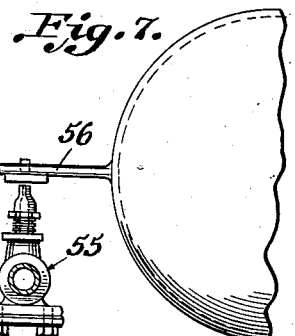
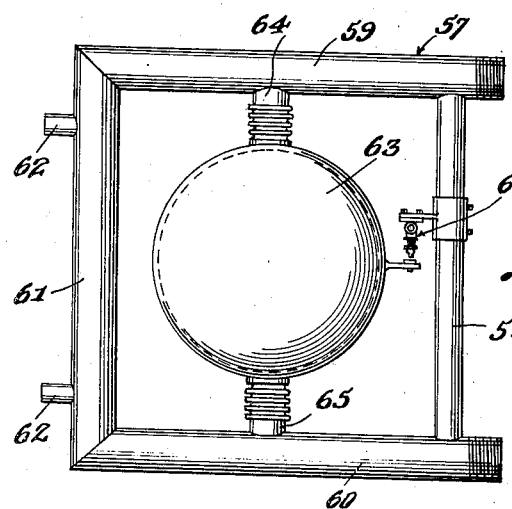
Inventor
Noel L. Dalton
By Kimmel & Crowell
Attorneys Patented Oct. 11, 1938

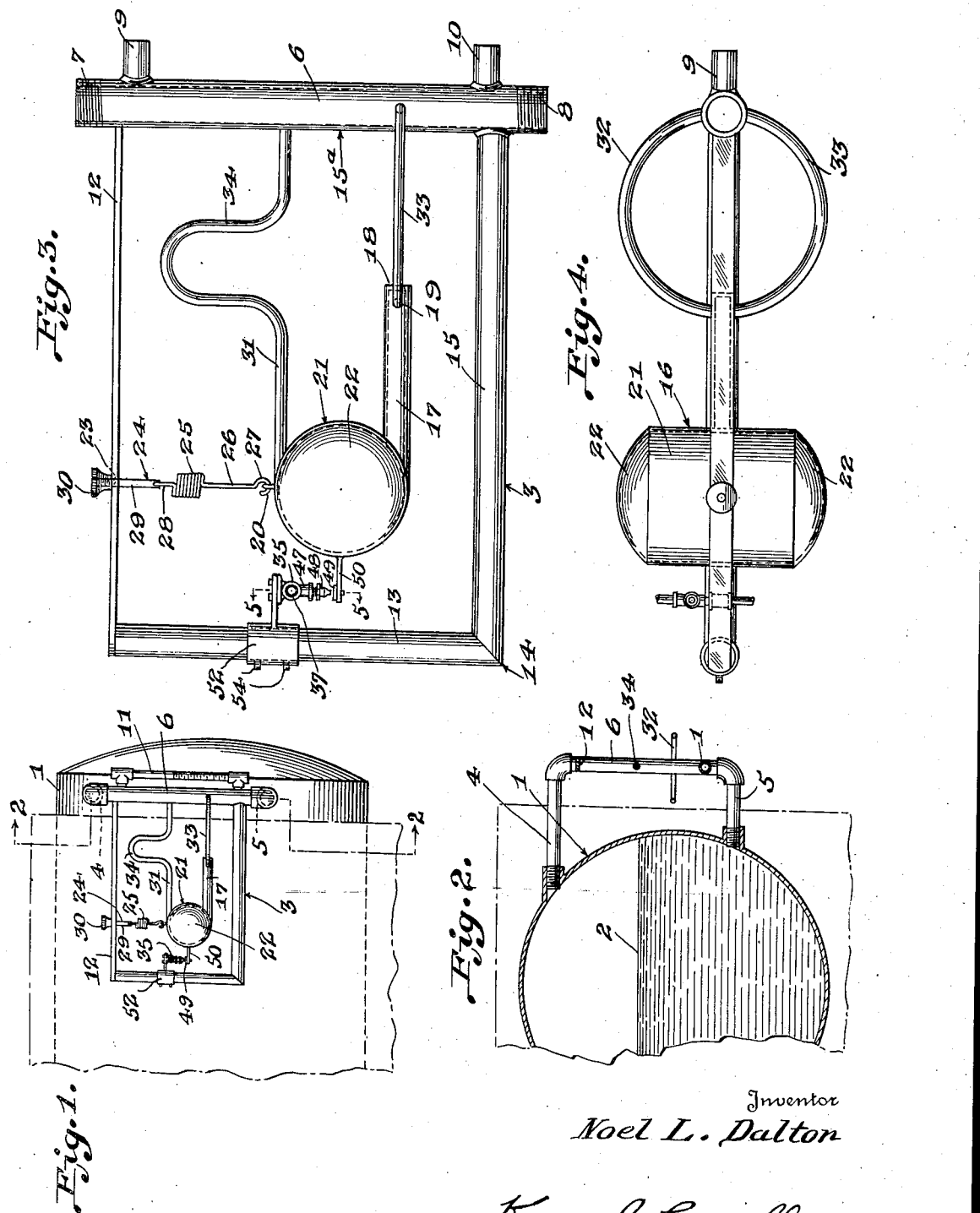

2,133,190

UNITED STATES PATENT OFFICE 2,133,190

LIQUID LEVEL CONTROL APPARATUS

Noel L. Dalton, Wewoka, Okla.

Application September 28, 1936, Serial No. 103,048

9 Claims. (Cl. 137—68)

This invention relates to a liquid level control apparatus.

The invention has for its object to provide, in a manner as hereinafter set forth, an apparatus of the class referred to that will maintain an exact level of the liquid, have practically no maintenance cost and which is cheaper to manufacture than the level controls now generaly used.

A further object of the invention is to provide, in a manner as hereinafter set forth, an apparatus of the class referred to so constructed and arranged to eliminate all friction in controlling the level of the liquid thereby giving a corresponding change of pressure to the diaphragm of the motor valve on the slightest variation of the liquid level and which entirely does away with "over control" due to friction lag which is present in all conventional types of kidney float liquid level controls.

A further object of the invention is to provide, in a manner as hereinafter set forth, an apparatus of the class referred to without the employment of a packing gland of any kind whereby the apparatus will be enabled to efficiently control the level of highly volatile liquids under pressure.

A further object of the invention is to provide a level control using compressed air or gas from an independent source as a motive power to operate a motor valve used in conjunction with said level control to control the flow of liquid in or out of a tank or container in order to maintain a constant level therein.

A further object of the invention is to provide, in a manner as hereinafter set forth, an apparatus of the class referred to so constructed as to include no joints to become worn, loose, or leak, which otherwise would cause lost motion, so common in the form of level control devices now generally used.

A further object of the invention is to provide, in a manner as hereinafter set forth, an apparatus for the purpose set forth whereby the controlling action is carried out without the employment of gaskets, a float ball or any leakage.

Further objects of the invention are to provide, in a manner as hereinafter set forth, an apparatus for the purpose referred to which is strong, durable, compact, readily installed with respect to the container carrying the liquid to have its level controlled, automatic in its action, inexpensive to maintain, thoroughly efficient in its use, easily repaired when occasion requires, readily assembled, and comparatively inexpensive to manufacture.

To the above ends essentially and to others which may hereinafter appear, the invention consists of the novel construction, combination and arrangement of parts as will be more specifically referred to and are as illustrated in the accompanying drawings wherein are shown embodiments of the invention, but it is to be understood that changes, variations and modifications may be resorted to which fall within the scope of the invention as claimed.

In the drawings:

Figure 1 is a fragmentary view in side elevation of a boiler or tank showing the adaptation therewith of a liquid level control apparatus in accordance with this invention, Figure 2 is a section on line 2—2, Figure 1.

Figure 3 is a front elevation of the apparatus upon an enlarged scale,

Figure 4 is a top plan view of the apparatus,

Figure 5 is a section on line 5—5, Figure 3 upon an enlarged scale,

Figure 6 is a fragmentary view in side elevation of the apparatus,

Figure 7 is a fragmentary view in front elevation of a modified form, and

Figure 8 is a front elevation of still another modified form.

With reference to Figures 1 and 2, a boiler or tank 1 containing a body of liquid 2 is shown. The level of the liquid 2 within boiler or tank 1 is to be maintained by the apparatus in accordance with this invention. Figures 1 and 2 also show the adaptation with the boiler or tank 1 of the apparatus which is generally indicated at 3. The apparatus includes upper and lower tubular branches 4, 5 respectively for establishing communication between the apparatus and the interior of the boiler or tank 1 respectively above and below the liquid level 5.

With reference to Figures 1 to 6 inclusive, the apparatus 3 includes a vertically disposed tubular member 6 having its ends peripherally threaded as at 7, 8 for connecting thereto the branches 4, 5 respectively. Extending laterally from the outer side of member 6, as well as opening into the latter is a pair of superposed aligned tubular nipples 9, 10 which are secured to and open into a gauge glass 11. Anchored at one end to the inner side of member 6 near the upper end of the latter is the outer end of a horizontally disposed supporting bar 12 which has its rear end secured to the top of the vertical leg 13 of an angle-shaped bar 14. The horizontal leg of bar 14 is indicated at 15. The leg 13 is arranged in parallel spaced relation to and is of less height than member 6. The leg 15 extends outwardly from the lower end of leg 13 and is secured to the inner side of member 6 near the bottom of the latter. The bar 14 is of circular cross section. The member 6 and bars 12, 14 form a rectangular supporting frame 15ª disposed on its lower lengthwise edge.

Extending through the frame 15ª between its vertical median and its inner side is a closed vertically movable controlling container 16 having projecting forwardly from the lower end of its forward side a hollow extension 17 which opens at its inner end into the container and is closed at its outer end as at 18. The extension 17 in proximity to its end 18 is formed in its sides with a pair of aligned openings 19, only one shown. The extension 17 is disposed tangentially to the bottom of container 16. The latter centrally of its top has extending upwardly therefrom eyes 20. The container 16 includes a cylindrical portion 21 of uniform diameter and a pair of oppositely extended round end portions 22. The bar 12 aligns with the diametric center of the cylindrical portion 21 of the container 16. The latter extends laterally in opposite directions relative to the frame 15ª. The extensions 17 align with the bar 12.

Extending through the opening 23 in the bar 12 is a tensioned adjustable hanger element 24 for the container 16. The element 24 includes a vertically disposed closely coiled spring 25 having its lower end extended, as at 26 and formed with a hook 27 which engages the eye 20 for connecting container 16 and element 24 together. The upper end of the spring 24 is extended, as at 28 and is anchored to the lower end of a vertically disposed peripherally threaded bar 29 passing up through the opening 23. Mounted and threadedly engaging with the bar 29 is a combined adjusting and suspending nut 30 for element 24.

There is associated with the member 6 and container 16 a flexible tubing 31 and a pair of oppositely disposed semi-circular flexible tubes 32, 33. The tubing 31 intermediate its ends is formed with an upstanding inverted U-shaped portion 34. The forward end of tubing 31 opens into the inner side of member 6. The rear end portion of tubing 31 opens into and is disposed tangentially relative to container 16 at the top of the front of the latter. The tube 32 at one end opens into one side of member 6 and at its other end into one side of extension 17 at one of the openings 19. The tube 33 at one end opens into the other side of member 6 and at its other end opens into the other side of extension 17 through the other of the openings 19. The tubing 31 aligns with the extension 17.

There is arranged relative to the container 6, to be controlled by the latter, a pilot valve assembly 35 which is interposed in an air or gas pressure conducting line leading to a controlling valve, not shown, for a feed, not shown, for the tank 1 for the purpose of maintaining the desired level of liquid therein when the same is a boiler, or for a discharge as in the case of an accumulation. The section of the air or gas pressure conducting line leading to the assembly 35 is indicated at 36 and the section of the air or gas pressure conducting line leading from the assembly 35 to the controlling valve for the feed or discharge, as the case may be, is indicated at 37. The controlling valve for the feed will be of known construction.

The pilot valve assembly 35 includes an inverted T-shaped housing 38 having its bottom portion divided into an air or gas pressure intake chamber 39 and an air or gas pressure outlet chamber 40 by a partition 41. The latter is formed with an inverted tapered opening 42 which establishes communication between said chambers. Carried by the housing 38 is an adjustable leak valve 43, of the needle type, which associates with a valve seat provided by the wall of opening 42. The housing 38 includes a peripherally threaded tubular extension 44 which extends in and opens into one side of the head 45 of a T-shaped housing 46. The stem of the latter is indicated at 47 and has adjustably connected therewith, as well as depending therefrom an adjustable vent member or valve 48 which is controlled by a valve 49 positioned upon a vertically movable carrier 50 anchored to and extending laterally from the inner side of container 16. The head 45 of housing 46 has connected thereto a flat plate 51 which is secured to an arm 52 on an adjustable sleeve 53 mounted on the leg 13 of the bar 14. The sleeve 53 is fixed in its adjusted position by the set screws 54. The pilot valve assembly 35 is for controlling the operation of a motor valve for the fed or discharge.

A motor valve is a valve operated by the action of pressure on a diaphragm connected to the valve, the diaphragm being considered as the motor, hence the term "motor valve". A motor valve that closes as pressure is applied to the diaphragm is considered a direct acting motor valve. A motor valve that opens as pressure is applied to the diaphragm is called a reverse acting motor valve. On a tank where the level is maintained by feeding a liquid into the tank, a reverse acting motor valve would have to be used with the pilot valve assembly in the position on Figure 7. This can be explained as follows: As the liquid level rises in boiler 1 and container 16 causing container 16 to become heavier and drop down, it opens pilot valve 49 allowing the air pressure to vent off from diaphragm of motor valve, which must be a reverse acting motor valve so that it will start closing as the air pressure is vented off from the diaphragm. However, if the liquid is being discharged out of tank 1 in order to maintain a level, the motor valve would have to open as the pressure is released from the diaphragm, which would make it necessary to use a direct acting motor valve. This is the advantage of having the pilot valve itself reversible. If tank 1 was considered as a boiler, and the boiler feed line was equipped with a direct acting motor valve, it would not be necessary to change to a reverse acting motor valve, simply reverse the position of the pilot valve assembly as in Figure 7 to get the desired results.

In order to make adjustments to compensate the difference in weight of liquids on which the control may be used, such as water and gasoline, for instance, the nut 30 is used and is employed to adjust the element 24 to change the level to any desired position within its range of control.

The pilot valve assembly 35 is of the variable leak type taking very little motor power to operate it.

The tubing 31 and tubes 32, 33 are flexible enough to give the desired movement to more than cover the entire range of control.

With reference to Figure 7 the construction of the modified form shown thereby will be the same as that shown in Figure 6 with this exception that the pilot valve assembly indicated at 55 is reversed with respect to the assembly 35 and that the carrier 56 is arranged above and not below assembly 35 as is shown in Figure 6.

With reference to the modified form shown by Figure 8, it includes an upstanding rectangular frame 57 formed of a solid outer bar 58, a tubular top bar 59, a tubular bottom bar 60 and a tubular inner bar 61. The bars 59, 60 and 61 open into each other. The bars 59, 60 are adapted to be connected by means, such as shown in Figures 1 and 2 for establishing communication between bars 59, 60 and boiler or tank 1. The bar 61 has a pair of superposed hollow nipples 62 for connection to a gauge glass not shown. Suspended within the frame 57 is a container 63 which performs a function similar to container 16. Opening into the bars 59, 60 are upper and lower conductors 64, 65 respectively of bellow-like form and which open into the top and the bottom respectively of the container 63. Otherwise than that as stated the form shown in Figure 8 will be the same as that shown in Figure 3. In Figure 8 the pilot valve assembly is indicated at 64.

What I claim is:

1. In a liquid level control apparatus, a resiliently suspended vertically movable container for receiving a body of liquid and having its movement controlled by the varying of the level of the liquid received thereby, stationary supporting means in which said container is arranged and to which the container is attached, said means having a portion thereof for communication with a point above and a point below the level of the liquid source from which the liquid is supplied to the container superposed communicating means leading from above and below the level of the body of the liquid within said container to said portion, a fluid pressure conducting line extended through said supporting means and adapted to lead to a feed controlling means for supplying liquid to said source, a stationary pilot valve assembly interposed in said line and including an adjustable vent member, an adjustable leak valve and a valve controlling said member, and means extended laterally from and bodily movable with said container for controlling said assembly on the varying of the level of the liquid within the container.

2. In a liquid level control apparatus, a stationary frame including a tubular means, a vertically movable container resiliently suspended in said frame for receiving a body of liquid and having its movement controlled by the level of the body of liquid received therein, means for establishing communication between said container and tubular means, a pilot valve within and suspended from said frame, means extended from one side of and bodily movable with said container for controlling said pilot valve on the varying of the level of the liquid within the container, and means for establishing communication between said tubular means and a source of liquid supply.

3. In a liquid level control apparatus, a resiliently suspended vertically movable container for receiving a body of liquid and having its movement controlled by the level of the liquid received therein, a stationary frame-like supporting structure within which is arranged and from which said container is resiliently suspended, said structure having a part thereof constituting a liquid conducting means adapted to communicate at its ends with a source of liquid, upper and lower flexible means for establishing communication between said container and the said liquid conducting means at spaced points of the latter, a pilot valve assembly within and carried by said structure and arranged relative to said container, and means extended laterally from and bodily movable with the container for coacting with said pilot valve assembly on the varying of the level of the liquid within the container.

4. In a liquid level controlling apparatus, a stationary supporting frame having a tubular portion for communication at two spaced points thereof with a liquid source and for communication with a gauge glass, a vertically movable liquid receiving container arranged within and resiliently suspended from said frame, said container communicating at two spaced points thereof with said tubular portion and having its movement controlled by the weight of the liquid received therein, a pilot valve assembly within and suspended by said frame in aligned spaced relation to said tubular portion adjacent said container, and means extended laterally from one side of and bodily movable with said container for controlling the operation of the said assembly on the varying of the weight of the liquid within the container, said assembly for interposition within a pressure conducting line.

5. In a liquid level controlling apparatus, a stationary frame including a pair of side members and a top and a bottom member, one of said side members being tubular for connection to a gauge glass and for communication with a liquid container above and below the level of the liquid within the container, a vertical movable liquid receiving receptacle within said frame and having its movement controlled by the level of the liquid received therein, a pilot valve assembly arranged within the frame and suspended from the other of said side members, an adjustable resilient structure connected to said top member for suspending said receptacle, a hollow extension projecting from and opening into the bottom of said receptacle, a single flexible tubing for establishing communication between said tubular side member and the top of the receptacle, and a pair of oppositely extending flexible tubings for establishing communication between said extension and said tubular side member.

6. The invention as set forth in claim 5 having the single tubing formed intermediate its ends with an inverted U-shaped portion, and each of said tubings of said pair of tubing being of semi-circular contour and disposed substantially at right angles to the single tubing.

7. In a liquid level control apparatus, a frame including a pair of side members and a top and a bottom member, said top and bottom members being tubular and for communication with a tank containing a body of fluid respectively above the level and below the level of the fluid, one of said side members being tubular, opening into said top and bottom members and for communication with a gauge glass, a vertical movable liquid receiving receptacle arranged in said frame and having its movement controlled by the level of the liquid received therein, oppositely disposed aligned spaced tubular resilient elements for suspending the receptacle within the frame, one of said elements communicating with said top member and opening into the upper end of the receptacle, the other of said elements communicating with the lower end of the receptacle and opening into said bottom member, a pilot valve assembly carried by the other frame side member and disposed within the frame, and means connected to, extended laterally from and bodily movable with the receptacle for controlling the pilot valve of said assembly.

8. In a liquid level control apparatus, a stationary supporting frame, a resiliently suspended vertically movable liquid receiving container within said frame and having its vertical movement controlled by the level of the liquid received therein, said frame including a tubular portion for communication with a liquid reservoir above and below the level of the liquid in the reservoir, means for establishing communication between the top of the container and said portion, means for establishing communication between the bottom of the container and said portion, a pilot valve assembly arranged within and suspended from one side of said frame, and means bodily carried with and extended laterally from one side of the container for controlling the operation of said assembly on the varying of the weight of the liquid in said container.

9. In a liquid level control apparatus an upstanding stationary supporting frame, a vertically movable liquid receiving container arranged within said frame and having its vertical movement controlled by the level of the liquid received therein, a vertically adjustable resilient suspension for said container depending from the top of the frame and connected to the top of the container, said frame including a tubular portion for communication with the liquid reservoir above and below the level of the liquid in the reservoir, means for establishing communication between the top of the container and said portion, means for establishing communication between the bottom of the container and said portion at a point removed from the point of communication of said portion with the top of the container, a pilot valve assembly arranged within and suspended from said frame, and means bodily carried within and extended from one side of the container for controlling the operation of said assembly on the varying of the weight of the liquid in said container.

NOEL L. DALTON.